US012694640B2

(12) United States Patent
Mishra et al.

(10) Patent No.: US 12,694,640 B2
(45) Date of Patent: Jul. 28, 2026

(54) AUTOMATED COLOR RECOMMENDATIONS FOR IMAGES BASED ON OBJECT FEATURES

(71) Applicant: Adobe INc., San Jose, CA (US)

(72) Inventors: Shivam Mishra, Noida (IN); Satyam Rohila, Noida (IN); Nishant Rai, Bangalore (IN); Jaya Vineela Pasupuleti, Nuzvid (IN); Anubhav Jain, Faridabad (IN)

(73) Assignee: Adobe Inc., San Jose, CA (US)

( * ) Notice: Subject to any disclaimer, the term of this patent is extended or adjusted under 35 U.S.C. 154(b) by 278 days.

(21) Appl. No.: 18/225,950

(22) Filed: Jul. 25, 2023

(65) Prior Publication Data

US 2025/0037415 A1     Jan. 30, 2025

(51) Int. Cl.
  *G06V 10/56* (2022.01)
  *G06T 7/13* (2017.01)
  (Continued)

(52) U.S. Cl.
  CPC ............... *G06V 10/56* (2022.01); *G06T 7/13* (2017.01); *G06T 7/194* (2017.01); *G06T 7/70* (2017.01); *G06T 7/80* (2017.01); *G06V 10/25* (2022.01); *G06V 10/764* (2022.01); *G06T 2207/10024* (2013.01); *G06V 2201/07* (2022.01)

(58) Field of Classification Search
  CPC ...... G06V 10/56; G06V 10/25; G06V 10/764;
  G06V 2201/07; G06V 10/82; G06T 7/13;
  G06T 7/194; G06T 7/70; G06T 7/80;
  G06T 2207/10024; G06T 2207/20081;
  (Continued)

(56) References Cited

U.S. PATENT DOCUMENTS

2015/0178592 A1* 6/2015 Ratcliff ............... G06F 18/2413
                                                            382/155
2021/0004589 A1* 1/2021 Turkelson ............ G06V 10/809
  (Continued)

OTHER PUBLICATIONS

Irony, R.; Cohen-Or, D.; Lischinski, D. Colorization by example. In: Proceedings of the 16th Eurographics Conference on Rendering Techniques, 201-210, 2005. (Year: 2005).*
  (Continued)

*Primary Examiner* — Jennifer Mehmood
*Assistant Examiner* — Dustin Bilodeau
(74) *Attorney, Agent, or Firm* — Shook, Hardy & Bacon L.L.P.

(57) ABSTRACT

Various disclosed embodiments are directed to automatically generating a score indicative of a recommendation for applying a color value to content in an image based on extracting features from one or more objects in the image. In other words, particular embodiments map currently detected objects in an image to objects of the same class of historical images, which are then mapped to their corresponding background colors in order to recommend a particular background color of an image. In an illustrative example, if a particular set of Christmas objects, such as a reindeer object and Santa object, have historically been included in a red background, particular embodiments recommend a red color for the background of a currently processed image that includes the same reindeer and Santa objects.

20 Claims, 10 Drawing Sheets

(51) Int. Cl.

| | |
|---|---|
| *G06T 7/194* | (2017.01) |
| *G06T 7/70* | (2017.01) |
| *G06T 7/80* | (2017.01) |
| *G06V 10/25* | (2022.01) |
| *G06V 10/764* | (2022.01) |

(58) Field of Classification Search
CPC ......... G06T 2207/20084; G06T 7/0002; G06T 2207/30168
USPC .......................................................... 382/167
See application file for complete search history.

(56) References Cited

U.S. PATENT DOCUMENTS

| | | | |
|---|---|---|---|
| 2023/0188831 A1* | 6/2023 | Hyun | ......................... G06T 7/11 348/207.1 |
| 2024/0037811 A1* | 2/2024 | Azaz | ..................... G06F 40/103 |

OTHER PUBLICATIONS

Sandler et al. "MobileNetV2: Inverted Residuals and Linear Bottlenecks", Mar. 21, 2019, 14 pages.
Sandler et al, "MobileNetV2: The Next Generation of On-Device Computer Vision Networks", Apr. 3, 2018, 6 pages.

* cited by examiner

700

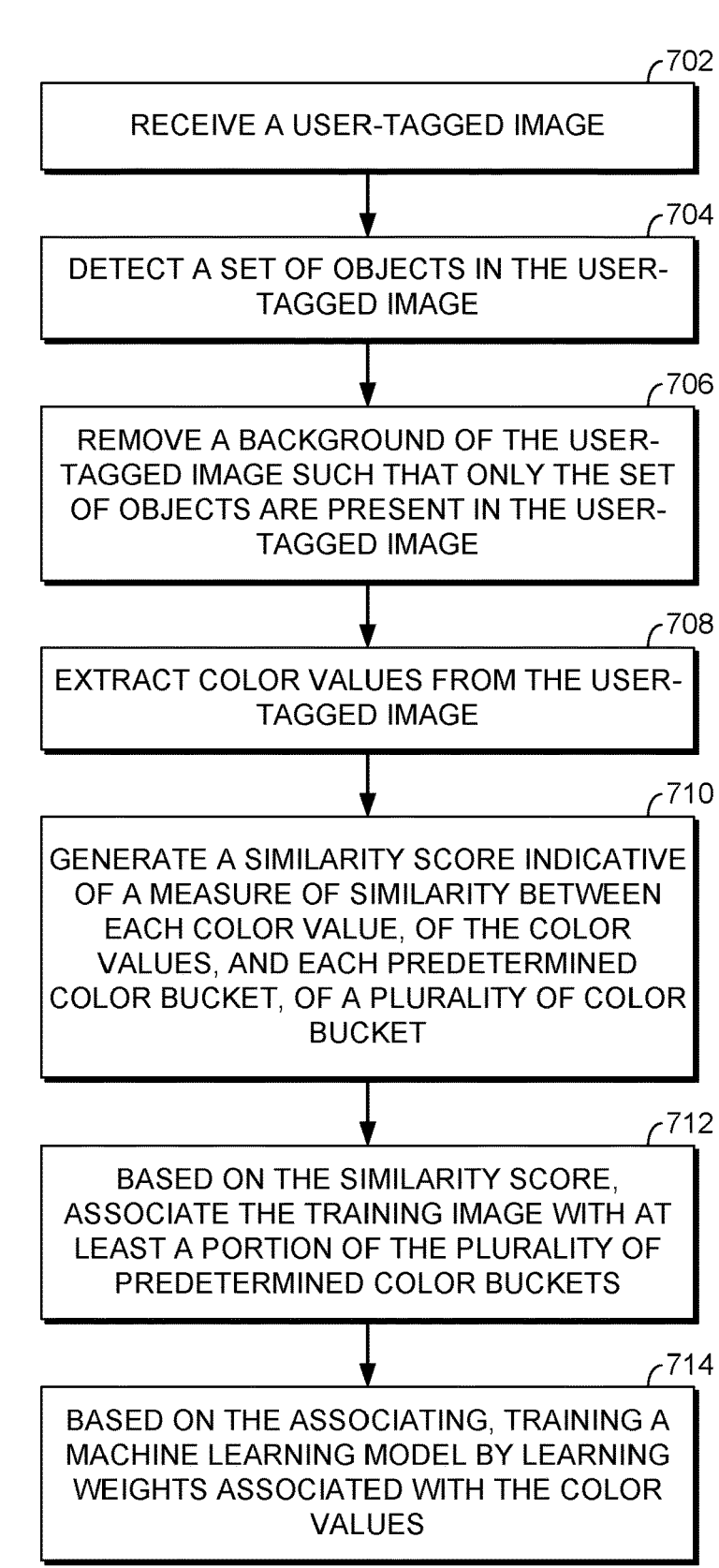

702

RECEIVE A USER-TAGGED IMAGE

704

DETECT A SET OF OBJECTS IN THE USER-TAGGED IMAGE

706

REMOVE A BACKGROUND OF THE USER-TAGGED IMAGE SUCH THAT ONLY THE SET OF OBJECTS ARE PRESENT IN THE USER-TAGGED IMAGE

708

EXTRACT COLOR VALUES FROM THE USER-TAGGED IMAGE

710

GENERATE A SIMILARITY SCORE INDICATIVE OF A MEASURE OF SIMILARITY BETWEEN EACH COLOR VALUE, OF THE COLOR VALUES, AND EACH PREDETERMINED COLOR BUCKET, OF A PLURALITY OF COLOR BUCKET

712

BASED ON THE SIMILARITY SCORE, ASSOCIATE THE TRAINING IMAGE WITH AT LEAST A PORTION OF THE PLURALITY OF PREDETERMINED COLOR BUCKETS

714

BASED ON THE ASSOCIATING, TRAINING A MACHINE LEARNING MODEL BY LEARNING WEIGHTS ASSOCIATED WITH THE COLOR VALUES

FIG. 7.

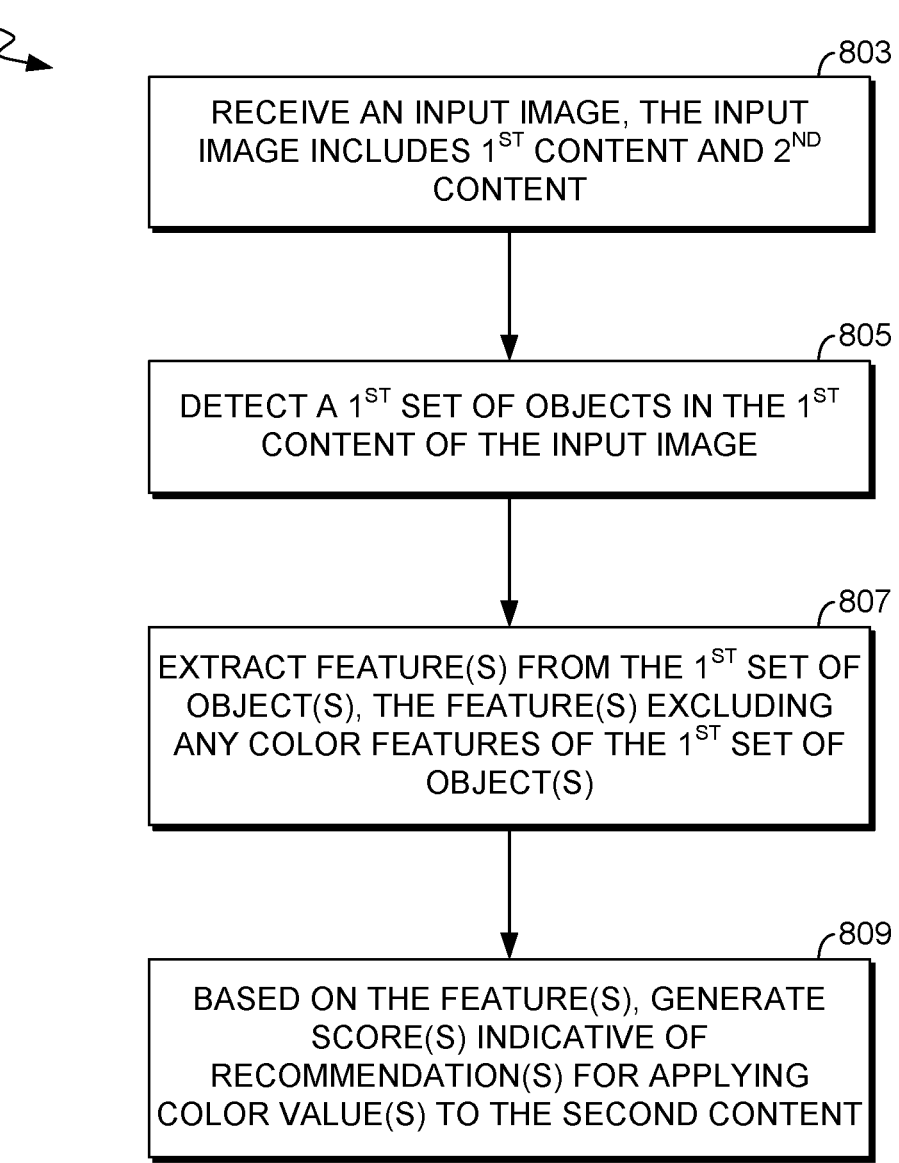

800

803
RECEIVE AN INPUT IMAGE, THE INPUT IMAGE INCLUDES 1$^{ST}$ CONTENT AND 2$^{ND}$ CONTENT

805
DETECT A 1$^{ST}$ SET OF OBJECTS IN THE 1$^{ST}$ CONTENT OF THE INPUT IMAGE

807
EXTRACT FEATURE(S) FROM THE 1$^{ST}$ SET OF OBJECT(S), THE FEATURE(S) EXCLUDING ANY COLOR FEATURES OF THE 1$^{ST}$ SET OF OBJECT(S)

809
BASED ON THE FEATURE(S), GENERATE SCORE(S) INDICATIVE OF RECOMMENDATION(S) FOR APPLYING COLOR VALUE(S) TO THE SECOND CONTENT

AUTOMATED COLOR RECOMMENDATIONS FOR IMAGES BASED ON OBJECT FEATURES

BACKGROUND

Various technologies render and modify media, such as photographic images or video. For instance, some media editing software applications employ tools (e.g., cut, paste, or color fill) so that users can request specific modifications of media. In an illustrative example, if a user desires to change the color of a portion of a photographic image, the user typically has to manually indicate the boundaries of the portion and then manually select a color or pixel value that they would like the portion to be changed to.

SUMMARY

One or more embodiments are directed to automatically generating a score (e.g., a softmax probability score) indicative of a recommendation for applying a color value to content in an image based on extracting features from one or more objects in the image. For example, particular embodiments recommend, via a multi-output Convolutional Neural Network (CNN), the color of a background of an image to be red based on detecting (e.g., via object detection) objects in the image, where corresponding objects of the same class have been detected in historical training images, which also have a red background. In other words, particular embodiments map currently detected objects in an image to objects of the same class of historical images, which are then mapped to their corresponding background colors in order to recommend a particular background color of an image. In an illustrative example, if a particular set of Christmas objects, such as a reindeer object and Santa object, have historically been included in a red background, particular embodiments recommend a red color for the background of a currently processed image that includes the same reindeer and Santa objects.

Particular embodiments have the technical effect of improved user interfaces, user experiences, and human-computer interaction relative to existing technologies. Additionally, particular embodiments also have the technical effect of improving the decision statistics or prediction score accuracy relative to existing media processing model technologies. Moreover, some embodiments improve computing resource consumption, such as computer I/O and network costs, as described in more detail herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

FIG. 7 is a flow diagram of an example process for training a machine learning model, according to some embodiments.

FIG. 8 is a flow diagram of an example process for making one or more recommendations for applying one or more color values to content of an input image, according to some embodiments.

DETAILED DESCRIPTION

Overview

Figure 1:
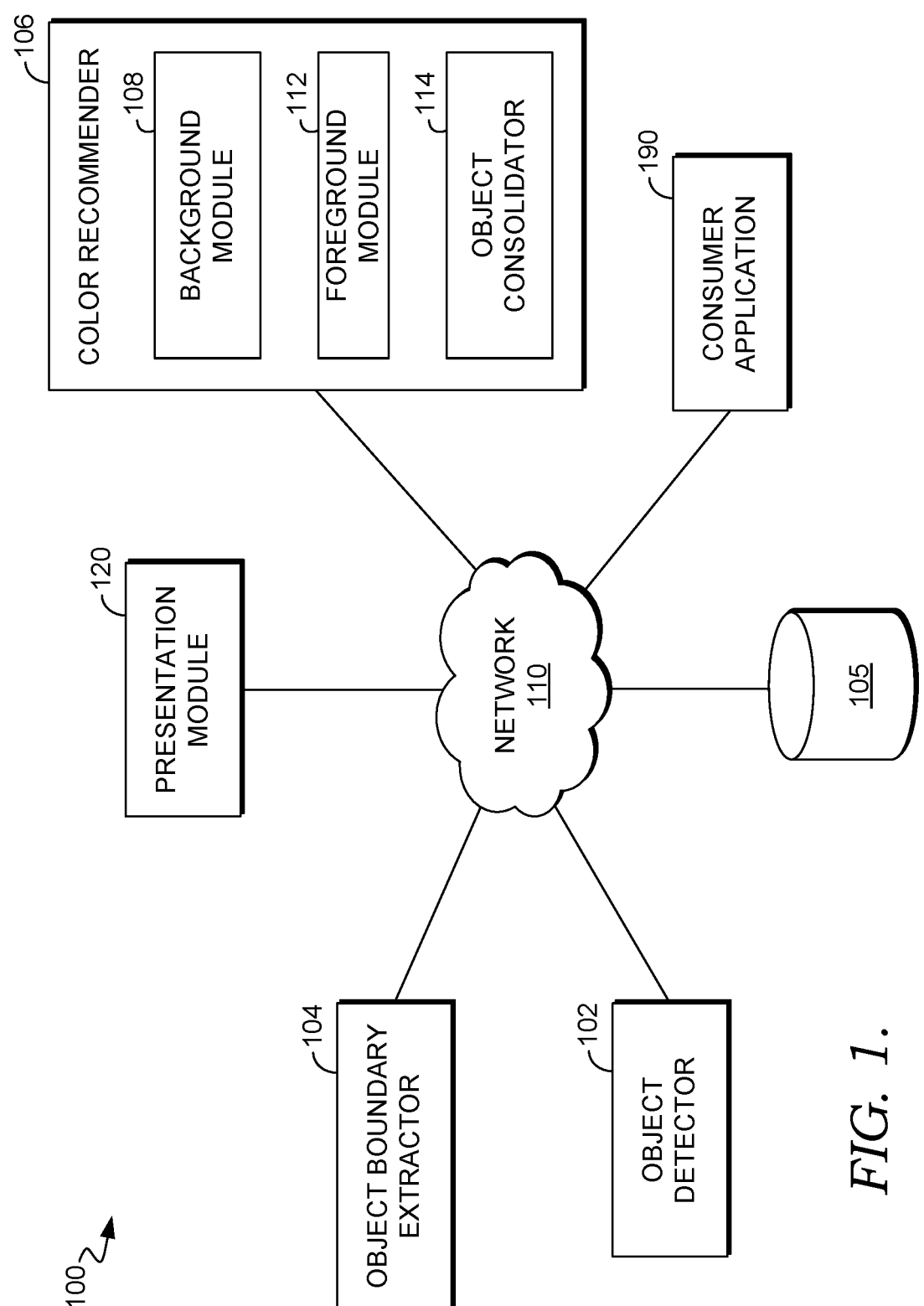
FIG. 1 is a block diagram of a computing system architecture in which aspects of the present disclosure are employed, according to some embodiments.

Users often desire to edit a particular artwork, photograph, video, or other media content, which requires changing or applying color to the content. For example, the user may explicitly request to change color of the background of an image. In another example, the user may request cropping out an unwanted object, which requires filling in the portion of the unwanted object with a suitable color. However, because existing technologies are complex and require extensive manual user input, achieving the best color is difficult if not impossible. For example, some media software editing user interfaces require users to manually select, via a lasso gesture, a portion of the image the user desires to change the color of. These user interfaces additionally require users manually scroll or drill through multiple pages of color choices and the user must then select the choice that they think is best to apply to the portion of the image. However, choosing the best colors (or those colors that look the most aesthetically pleasing) is a difficult task. This is due in part because there is a wide spectrum of colors or pixel values that users have to choose from, many of which are often indistinguishable from each other. Consequently, the user often has to provide unnecessary manual user input by selecting multiple color choices and then viewing each of the choices in the image to make a final decision. This is very arduous, time consuming for users, and causes unnecessary computer user input/output (I/O). Although some software applications include tutorials or assistant functionality, they are often not helpful and still require a great deal of mastery before the user can apply a given color to an image. Users often cannot pinpoint what exact color they need so these tutorials or assistants may not be helpful.

Existing media processing models are also deficient. Although particular models can predict what color a portion of the image should be, the prediction accuracy is low. For instance, some neural networks can make a decision statistic prediction (e.g., a confidence level score) on what color a portion of an image should be filled with based on colors of other portions of the same image. For example, where a neural network is trained on contrast principles, the foreground may be a dark brown color and the model may learn that the best background to the foreground color is a very well-contrasted light blue color. However, contrast principles and other model functionality fail to accurately model preferred aesthetic color preferences of users. For example, even though the light blue color contrasts well with dark brown, most users may find the overall picture to be displeasing and may instead choose a light brown color as the background. Accordingly, predicting that the background should be filled a particular color based on contrasting or other principles is inaccurate.

In yet other examples, these models may predict that portions of an image should be filled in with a particular color based on merging or aggregating a dot product of vectors that represent the colors that already exist in the image. But this is often inaccurate. For example, a user's photograph may mostly contain green pixels representing a dark green forest with a small set of pixels representing a blue car in the middle of the forest. The user may desire to change color of the blue car. However, because the dominant color in the image is green, the model may predict that the color of the pixels representing the blue car should be changed to teal or green color, which is likely to be aesthetically displeasing to the user and therefore inaccurate.

Embodiments of the present invention provide one or more technical solutions to one or more of these technical problems, as described herein. In operation, various embodiments are directed to automatically generating a score indicative of a recommendation for generating a color value of content in an image based on extracting features from one or more objects in the image. For example, particular embodiments recommend, via a multi-output Convolutional Neural Network (CNN), the color of a background of an image to be red based on detecting (e.g., via object detection) objects in the image, where corresponding objects of the same class have been detected in historical training images, which also have a red background. For example, if a particular set of Christmas objects, such as a reindeer object and Santa object, have historically been included in a red background, particular embodiments recommend a red color for the background of a currently processed image that includes the same reindeer and Santa objects.

In operation, some embodiments first receive an input image (e.g., a digital photograph), where the input image includes first content (e.g., a first set of foreground objects) and second content (e.g., a background). Some embodiments then detect a first set of objects in the first content. For example, object detection functionality is performed by detecting, via one or more bounding boxes, a location of the first set of objects and classifying the first set of objects (e.g., the first set of objects include a house, a car, and a tree). Some embodiments extract features from the first set of objects. For example, some embodiments convert the first set of objects into a matrix or vector of numbers representing the pixel values and then pass the numbers and their spatial orientation/coordinates (e.g., representing specific features, such as nose of a cat, mirror of a car door, etc.) to a model. The model may then classify the image or object in the image based on the extracted features.

Based on the features of the first set of objects, some embodiments then generate one or more scores indicative of one or more recommendations for applying one or more color values to the second content. For example, particular number values and their orientation in a matrix may represent various car features, such as a trunk, hood, door, and wheels. Responsively, particular embodiments classify the objects as a car based on the features. Responsively, particular embodiments search for historical images (or determine a distance to vectors representing historical images), where a car has been identified. Particular embodiments then identify corresponding background colors of those historical images and recommend a color to fill in the background of the input image with based on the background colors of the historical images.

Particular embodiments have the technical effect of improved user interfaces, user experiences, and human-computer interaction relative to existing technologies. This is because user interfaces of various embodiments are not as complex and do not require extensive manual user input. For example, instead of requiring users scroll through multiple pages of color choices and requiring the user to select a color choice that the user thinks is best to apply to a portion of an image, particular embodiments automatically (without user input) recommend color choices. Accordingly, one technical solution is the automatic generation of one or more scores indicative of one or more recommendations for applying one or more color values to content. Another technical solution is detecting objects in images so that users do not have to manually indicate which objects they would like colored. In this way the user does not have to perform extensive drilling, scrolling, selecting or other computer user input at the user interface to find the most suitable color because embodiments automatically make recommendations and/or detect objects, thereby making the difficult task of finding the best colors from a wide spectrum more manageable.

Particular embodiments also have the technical effect of improving the decision statistics or prediction score accuracy relative to existing media processing model technologies. One reason is because particular embodiments perform the technical solution of generating a score indicative of a recommendation for applying a color value to content in an image based on features of objects/other content in the image. Instead of predicting what color a portion of an image should be filled with based only on colors of other portions of the same image (e.g., via contrast principles), particular embodiments make color recommendations based on non-color features, such as pixel/matrix values in an image that represent spatial orientation/coordinates of the payload (e.g., nose features of an animal). In other words, one technical solution is that such extracted features exclude any color features of objects. For example, using the illustration above, where the foreground of an image is a dark brown color, particular embodiments learn that the best background to the foreground color is a light brown color, instead of a light blue color, based on the same class of objects in historical images using the same light brown color background.

In some embodiments, such predictions are based on training a model with user-tagged images where users historically chose to fill in images with identical objects with a particular color. Because the historical images are user-tagged images (meaning that the users chose to color images with specific objects a certain color), these images accurately model preferred aesthetic color preferences of users. Therefore, yet another technical solution is using a model or training a model with user-tagged images, where the users set or change the color of the images, which models preferred aesthetic color preferences of users. Accordingly, using the illustration above, recommending that the background should be filled in with the light brown color (as opposed to a light blue color) is more accurate than existing technologies.

Moreover, some embodiments improve computing resource consumption, such as I/O and network costs. As described above, existing user interfaces require users to scroll through, drill down, issue multiple queries, or otherwise make repeated manual selections to select objects and make final color choice determinations. This increases storage device I/O (e.g., excess physical read/write head movements on non-volatile disk) because each time a user makes these selections, the system has to repetitively reach out to the storage device to perform read/write operations, which is time consuming, error prone, and eventually wears on components, such as a read/write head. Additionally, with session or network-based web applications, each user input requires packet generation costs (e.g., input header information) for network protocols (e.g., TCP/IP), which increases network latency after repeated selections being transmitted over a network. For instance, each time a user clicks on a page of color choice results or issues a different query to obtain a different color choice candidate, packet headers may have to be exchanged and the payload of the data has to traverse the network. Further, if users repetitively issue queries to get the desired color choice, it is computationally expensive. For example, an optimizer engine of a database manager module calculates a query execution plan (e.g., calculates cardinality, selectivity, etc.) each time a query is issued, which requires a database manager to find the least expensive query execution plan to fully execute the query. This decreases throughput and increases network latency, and can waste valuable time. Most database relations contain hundreds if not thousands of records. Repetitively calculating query execution plans to obtain the desired color choice on this quantity of rows decreases throughput and increases network latency.

However, as described above, particular embodiments automatically generate a score (without user input) indicative of a recommendation for generating a color value of content in an image (or otherwise automatically fill in content with the recommended color). Some embodiments additionally detect one or more objects in an image. Accordingly, because of this automated functionality, the user does not have to scroll through, drill down, issue multiple queries, or otherwise make repeated manual selections to select objects and make final color choice determinations. Rather, objects are automatically detected and color choice recommendations are automatically made or applied. This decreases storage device I/O because the system has to reach out to the storage device to perform read/write operations fewer times, which means that the storage device is less error prone, and wears less on components, such as a read/write head. Additionally, there is a decrease with network latency because fewer object selections or color choice selections are being transmitted over a network via object detection and/or automatic color recommendations. Consequently, fewer packet headers have to be exchanged and fewer payloads of the data have to traverse the network. Further, fewer queries are issued to get the desired color choice. Consequently, an optimizer engine of a database manager module calculates a query execution plan on fewer queries. This increases throughput and decreases network latency because query execution plans are calculated on fewer rows to obtain the desired color choice.

Exemplary System

Referring now to FIG. 1, a block diagram is provided showing aspects of an example computing system architecture suitable for implementing an embodiment of the disclosure and designated generally as the system 100. The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1000 of FIG. 10). Alternatively, some or each of the components may be distributed among various computing devices, such as in a distributed cloud computing environment. In some embodiments, the system 100 and each of the components are located within the server and/or user device of FIG. 9, as described in more detail herein.

The system 100 includes network 110, which is described in connection to FIG. 9, and which communicatively couples components of system 100, including the object detector 102, the object boundary extractor 104, the presentation module 120, the color recommender 106, the consumer application 190, and storage 105. The components of the system 100 may be embodied as a set of compiled computer instructions or functions, program modules, computer software services, logic gates, or an arrangement of processes carried out on one or more computer systems.

The system 100 generally operates to recommend one or more colors for filling one or more portions of an input image based on features in the input image. The object detector 102 is generally responsible for detecting or classifying one or more objects in an input image. An "image" as described herein is a visual representation of one or more portions of the real world or other visual representation, such as digital artwork (e.g., a digital sketch or digital water painting). For example, an image can be a digital photograph, a digital image among a sequence of video segments, a graphic image file (e.g., JPEG, PNG, etc.), a picture (or sub-element of a picture), and/or a bitmap among other things. An "object" as described herein refers to visual data that represents a real-world or recognizable thing.

In some embodiments, the object detector 102 performs object detection functionality to detect one or more objects in an image. In an illustrative example of object detection functionality, particular embodiments use one or more machine learning models (e.g., a Convolutional Neural Network (CNN)) to generate a bounding box that defines the boundaries and encompasses a computer object representing a feature (e.g., a car, the sky, a building, a person, etc.) in an image. These machine learning models can also generate a classification prediction that the computer object is a particular feature. In computer vision applications, the output of object detection can be encompassed by a bounding box. A bounding box encompasses the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects in documents. In an illustrative example, on an image, a first bounding box can be generated over a cat in an image and labeled as "cat", a second bounding box can be generated over a dog and labeled "dog", and a third bounding box can be generated over a mountain objects and labeled as "mountain".

In some embodiments, one or more machine learning models can be used and trained to generate tighter bounding boxes for each object. In this way, bounding boxes can change in shape and confidence levels for classification/ prediction and can be increased based on increased training sessions. For example, the output of a CNN or any other machine learning model described herein can be one or more bounding boxes over each feature of an image (corresponding to a feature in an image), where each bounding box includes the classification prediction (e.g., this object is a building) and the confidence level (e.g., 90% probability).

Alternatively, in some embodiments the object detector 102 need not perform object detection functionality, but can perform image classification, object recognition, keypoint detection, or other functionality where different features or objects are identified in an image. For example, with respect to image classification, embodiments can perform pixel-based classifications (e.g., minimum-distance-to-mean, maximum-likelihood, and minimum-Mahalanobis-distance) or object-based classifications to classify an entire image (without determining location information, such as a bounding box). For example, some embodiments perform pre-processing functionality, such as converting the image into a vector or matrix, where each value (e.g., an integer or float) represents a corresponding pixel value in the image. In some embodiments, such as in K-Nearest Neighbor (KNN) use cases, particular embodiments determine the distance between such vector and other vectors that represent training images, where the closest vectors indicate that a set of pixels (or the entire image) corresponds to a certain class.

The object boundary extractor 104 is generally responsible for determining the boundaries of each object/feature detected by the object detector 102. For example, in response to the object detector 102 detecting a set of objects, via a bounding box, the object detector 102 programmatically calls the object boundary extractor 104 in order to more precisely determine pixel-wise boundaries of all the set of objects contained in bounding boxes. In some embodiments, the object boundary extractor 104 performs its functionality via semantic segmentation. Semantic segmentation refers to the task of assigning and indicating (e.g., via a unique pixel-wise mask color or ID) each pixel to a particular class of a real-world object or background represented in an image. For example, semantic segmentation functionality may define a first set of pixels as representing a "bird" and a second set of pixels as also representing a "bird," where both birds are represented by the same mask pixel value. In some embodiments, instance segmentation is additionally performed. Instance segmentation assigns and defines, with a unique identifier, each pixel to the instance of the real-world object it belongs to. For example, using the illustration above, the first set of pixels representing the first bird may be assigned an instance ID of 1 and a first color mask pixel value. Likewise, the second set of pixels representing the second detected bird may be assigned an instance ID of 2 and/or different mask color pixel value.

The combination of semantic segmentation and instance segmentation is what is referred to as panoptic segmentation. Specifically, in panoptic segmentation, all pixels of an image are uniquely assigned to one of the background classes (referred to as "stuff") or one of the object instances (referred to as "things"). For things, panoptic segmentation functionality thus classifies each pixel in an image as belonging to a particular class and identifies what instance of the class the pixel belongs to. For stuff, panoptic segmentation performs identical functionality as semantic segmentation.

Semantic segmentation is typically a deep learning algorithm that associates a label or category with every pixel in an image. The idea is to label each pixel of an image with a corresponding class of what is being represented. It is used to recognize a collection of pixels that form distinct categories. For example, a model can be trained to mask objects with pixel values of vehicles, pedestrians, traffic signs, pavement, or other road features. For example, a CNN can perform image-related functions at each layer and then down sample the image using a pooling layer (e.g., green). This process is repeated several times for the first half of the network. The output from the first half of this diagram is followed by an equal amount of unpooling layers (e.g., orange). In some embodiments, the object boundary extractor 104 performs its functionality via MASK AI. Mask AI detects at least nine separate elements in a photo: people, skies, buildings, vehicles, water, plants, mountains, and both natural and artificial ground for the perfect mask.

In some embodiments, the object boundary extractor 104 performs background extraction functionality in order to remove background values in an image and/or distinguish background visual data from foreground (e.g., object) elements. For example, in response to embodiments performing semantic and/or instance segmentation, particular embodiments tag or label the corresponding instances (or pixels represented in the images) "foreground," where the rest of the pixels or data is tagged as backgrounds. In another example, some embodiments perform edge detection and/or contour functionality. Edge detection is an algorithm that finds the lines of contrast, or edges, in an image, which typically identifies the boundaries of objects. In some embodiments, this algorithms first pre-processes the image to help differentiate any objects by converting the image into black and white values to better distinguish edges. Contours are the continuous boundary lines between areas of contrasting color or intensity. Unlike edge detection, finding contours will find prominent shapes within the image. Contours are typically a curve joining all the continuous points (along the boundary), having same color or intensity. The contours are a useful tool for shape analysis and object detection and recognition. Accordingly, once edges are detected and contours defined, embodiments split the image into background and foreground at the edges. In some embodiments, any contours that are under and/or over a size threshold to be the foreground, are removed or considered the background and the remaining contours will be considered the foreground. In yet another example, some embodiments use a KNN-based (e.g., a SIOX) algorithm. These models assume that foreground and background have different colors, and models the segmentation task as a (supervised) classification problem, where the training data includes examples of foreground pixels and examples of background pixels, where the training is based both on color of the pixels and/or the actual objects (or pixel/line orientation). For example, a model can learn that most backgrounds are green in color or are associated with specific features, such as trees, sky, sun, clouds, and the like. Based on such training, particular embodiments classify the rest of the pixels according to color or features.

The color recommender 106 is generally responsible for recommending one or more colors to fill one or more portions of an image with based on the functionality performed by the object detector 102 and/or the object boundary extractor 104. The color recommender 106 includes the background module 108, the foreground module 112, and the object color consolidator 114. In an illustrative example of the color recommender 106, particular embodiments recommend the color of a background of an image based on detected objects in the image. Alternatively or additionally, some embodiments recommend the color of one or more objects in an image based on other detected object(s) in the same image. Alternatively or additionally, some embodiments recommend the color of one or more objects based on background features in the same image.

In some embodiments, the color recommender 106 represents or uses one or more machine learning models for recommending colors. For example, in some embodiments, the color recommender 106 is a model trained on a user-tagged data set of images. For instances, such user-tagged images can be supplied via ADOBE CAPTURE. ADOBE CAPTURE is a platform where user devices capture an image or their surroundings (such as in a video stream) and output color-themes representing the most dominant colors in the image or surroundings. A color theme is thus a set of colors representing the most dominant (i.e., a predetermined quantity of) colors in an image. After color themes are captured, users can adjust or change the color themes to a combination that is most aesthetically pleasing to them. Accordingly, various embodiments use these user-tagged images, where objects have been detected, color themes have been captured and changed in order to make a final recommendation. Particular embodiments propose a color-theme generation that is object aware (receives indication of detected objects) and represents objects color and background color. In other words, various images can be tagged or labeled with the objects contained in the image and the color themes or pallets captured/changed by the user so that the model can learn that for a given set of objects or background, the most dominant colors are X.

The background module 108 is generally responsible for recommending colors for a background of an image based on the detected objects in the image. The foreground module 112 is generally responsible for recommending colors for a foreground or a first set of objects in an image based on a second set of objects detected in the image and/or the background of the same image. In some embodiments, the functionality of the background module 108 and foreground module 112 is performed via a multi-output CNN-based machine learning model that outputs an object-aware color theme containing 5 colors where the first 3 colors represent the color of the object and the last 2 colors represent the color of the background, as described in more detail below.

The object color consolidator 114 is generally responsible for recommending background colors for each individually detected object or data element in an image and recommending a background color for a combination or consolidated set of objects in the image, as described in more detail below. This takes into account that an image may contain multiple objects, but for each detected object, there may be different color recommendations that are not consistent or similar to the color recommendations for the other objects. For example, an image may contain a car, a building, and a background, where the recommended color to the background of the car is a tan color and the recommended color to a building is a blue color (e.g., representing the sky). Some embodiments can cause display of each of these recommendations per object and/or cause display of an overall recommendation given all the objects. If an image contains multiple mages, some embodiments perform a dot product consolidation of all recommended colors for each object. For example, if a first recommended background of a first object is yellow and a second recommended background of a second object is red, the consolidate recommendation for both objects in the same image is orange (i.e., the combination of the colors). Alternatively, some embodiments select the most prominent color, as indicated in the training images (instead of combining training image colors). For example, using the illustration above, if a majority of training images with the first and second objects had a red background, then embodiments would recommend filing in the background with red (as opposed to a dot product of orange).

In some embodiments, presentation component 120 generates user interface features associated with the color recommendations. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation component 120 can cause presentation of an image and list of ranked color recommendations for a given portion (e.g., background or object) of an image. The presentation component 120 can additionally or alternatively cause presentation of other contextual data or metadata, such as timestamps of when a target image was uploaded, source images, UI elements for users to manipulate source images, and the like.

Consumer applications 190 generally refers to one or more computer applications or services, such as online/cloud applications or locally stored apps that consume, include, or utilize some or each of the components of the system 100. In particular, a consumer application 190 may receive an image in order to recommend and/or apply colors, as described within the system 100. In some embodiments, a consumer application 190 may utilize the presentation component 120 to provide a list of color recommendations. Examples of consumer applications 190 may include, without limitation, computer applications or services for presenting media and/or editing media (e.g., Adobe® Capture®). Adobe® Photoshop®, Adobe After Effects®. and Adobe Premiere®), or other computer applications that include such functionality, such as social media service applications (e.g., PINTEREST, FACEBOOK, etc.), email, messaging, chat, or any other web application, plugin, extension, or locally stored application.

Storage 105 generally stores information including data (e.g., images), computer instructions (for example, software program instructions, routines, or services), data structures, and/or models used in embodiments of the technologies described herein. In some embodiments, storage 105 represents any suitable data repository or device, such as a database, a data warehouse, RAM, cache, disk, RAID, and/or a storage network (e.g., Storage Area Network (SAN)). In some embodiments, storage 125 includes data records (e.g., database rows) that contain any suitable information described herein. In some embodiments, each record is called or requested and returned, over the computer network(s) 110, depending on the component needing it, as described herein.

Figure 2:
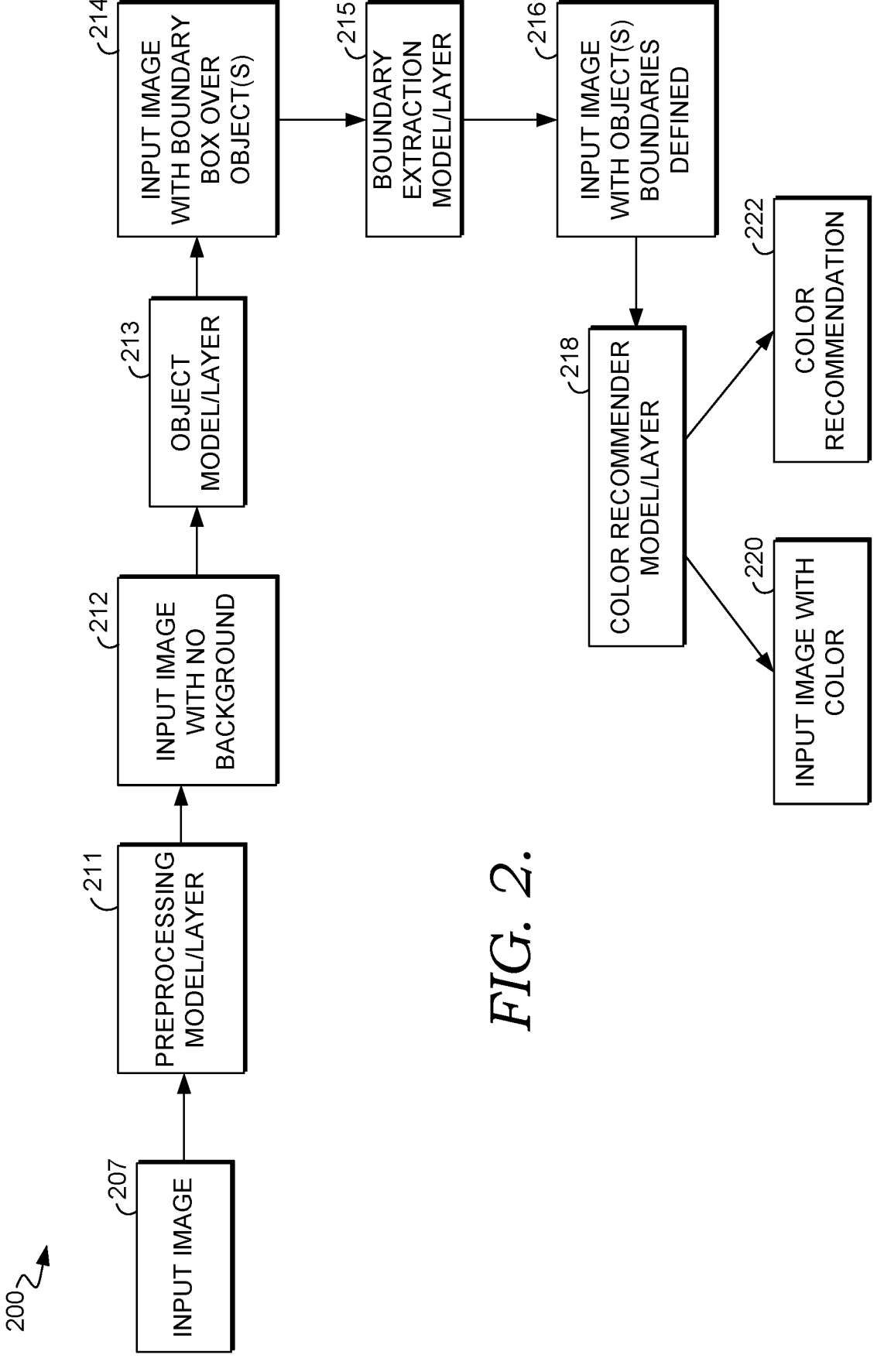
FIG. 2 is a schematic diagram illustrating different models or layers, each of their inputs, and each of their outputs, according to some embodiments.

FIG. 2 is a schematic diagram illustrating different models or layers, each of their inputs, and each of their outputs, according to some embodiments. A "model/layer" as illustrated in FIG. 2 represents a respective machine learning model (e.g., of an ensemble of models), or a different layer within a single machine learning model, such as an input layer, hidden layers, or and output layer of a neural network. At a first time, the preprocessing model model/layer 211 (e.g., an input layer) receives an input image. The preprocessing model/layer 211 modifies the input image in one or more ways, such as removing the background features and colors from the input image 207, converting the pixel values to a matrix or feature vectors of numbers that represent the pixel values to make it machine-readable, and/or converting the pixel values to black and white to better identify objects. In some embodiments, the preprocessing model/layer 211 represents particular functionality described with respect to the object detector 102, such as the ability to identify a background and/or objects and removing a background of the input image 207. The output of the preprocessing model/layer 211 is an input image with no background 212 (and/or a representation, such as a vector, that represents the input image with not background).

At a second time subsequent to the first time, the object detection model/layer 213 takes as input the input image with no background 212 (or matrix/feature vector representing such) and then detects, via object detection, each object in the modified input image 212 by detecting, via a bounding box, the location of each object and then classifying each object by labelling the object in the image with a certain category. In some embodiments, the functionality of the object detection model/layer 213 represents or includes the functionality as described with respect to the object detector 102 of FIG. 1. The output of the object detection model/layer 213 is the input image 214 with a bounding box over the objects in the image 214 (or matrix/feature vector representing such).

At a third time, subsequent to the second time, the boundary extraction layer receives, as input, the image 214 with the bounding box over the objects (or matrix/feature vector representing such) extracts or detects the boundaries of the detected objects. In some embodiments, the boundary extraction model/layer 215 is included in or represents the object boundary extractor 104 of FIG. 4. The output is the input image 216, with the object boundaries defined. For example, in some embodiments =, the boundary extraction model/layer 215 performs semantic and instance segmentation in and defines the boundaries by filling in each instance/object and its borders/boundaries with a particular pixel color value (e.g., red).

At a fourth time subsequent to the third time, the color recommender model/layer 218 takes, as input, the input image 216 with object boundaries defined and recommends filling in a background and/or foreground of the input image 207. In some embodiments, the color recommender model/layer 218 represents or includes the functionality as described with respect to the color recommender 106 of FIG. 1. In some embodiments, the output of the color recommender model/layer 218 is the input image 220 (i.e., an output image) with the color recommendation automatically filled into the input image. For example, the original input image 207 may include a single blue background color and 3 objects. However, the output image 220 may include a different background color—green—along with the same 3 objects. Alternatively or additionally, in some embodiments, the color recommender model/layer 218 produces a score or color recommendation, such as a color theme or palette (e.g., 226 of FIG. 3). For example, instead of automatically filing in a background color, as in 220, some embodiments cause presentation of a color theme of 5 colors, where 2 of the 5 are presented as recommendations for coloring the background and 3 of the 5 are recommended for coloring the foreground. Subsequently, particular embodiments receive an indication of a user selection of one or more of the colors and consequently cause color filling of the background and/or one or more objects.

Figure 3:
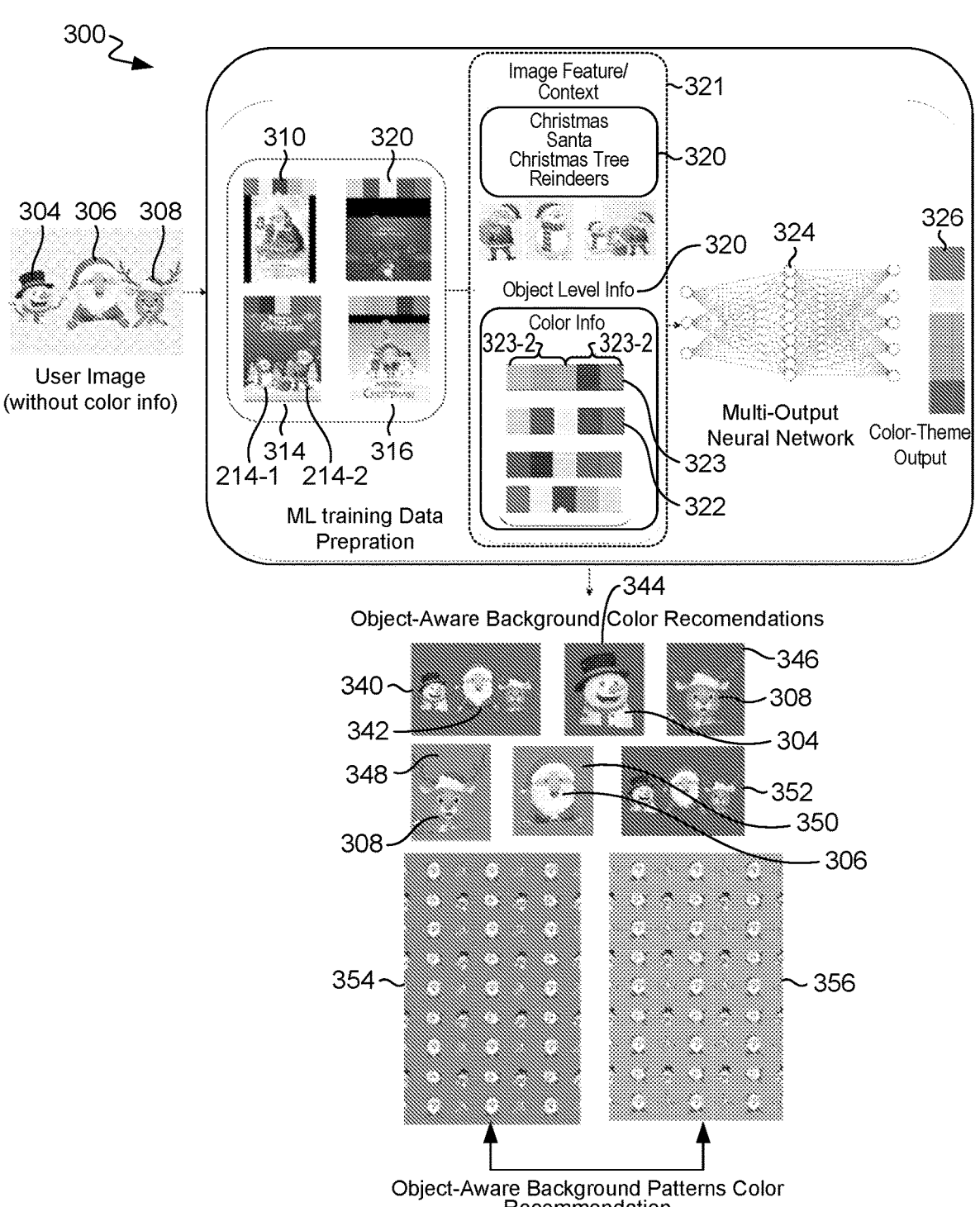
FIG. 3 is a schematic diagram illustrating how the background color is recommended for multiple objects of an input image based on training a machine learning model, according to some embodiments.

FIG. 3 is a schematic diagram illustrating how the background color is recommended for multiple objects of an input image 302 based on training a machine learning model 324, according to some embodiments. At a first time an input image 302 is received (e.g., uploaded to the consumer application 190). The user image 302 contains the snowman object 304, the Santa Clause object 306, and the reindeer object 308. Some embodiments perform preprocessing functionality, such as remove the background color and/or other features (e.g., trees, landscape, etc.) of the input image 302 (e.g., set a pixel value to a single opaque or clear color), such that only the objects are present in the input image 302.

In some embodiments, the input image 302 is then fed to the neural network 324, where the neural network 324 has been trained via ML training data preparation 330. The images 310, 312, 314, and 316 represent training images that have been selected based on the objects detected in the input image 302 (i.e., the objects 304, 306, and 308). For example, some embodiments perform a search function for objects detected in the training images that match detected objects in the input image 302. In other words, for example, if the snowman object 304 has been classified as "snowman" via object detection, some embodiments, search for the same natural language classification in the training data, such as "snowman," as indicated in 314-1. Alternatively or additionally, some embodiments generate a feature vector representing line segments or other spatial features (e.g., had, scarf, carrot) of the snowman object 304. Additionally, some embodiments generate individual feature vectors for the objects 306, and 308. Particular embodiments then aggregate or perform a dot product of these individual feature vectors. Some embodiments then determine a distance (e.g., a Euclidian distance) between each feature vector (and/or a dot product of the feature vectors) representing the objects 304, 306, and/or 308 and each feature vector representing the object(s) in the images 310, 312, 314, 316 (and additional images unrelated to the objects 304, 306, and 308). Responsively, these embodiments rank the images 310, 312, 314, and 316 the highest based on the distance being the closest.

The image feature context 321, includes the detected objects and other features determined in the selected training images 310, 312, 314, and 316—i.e., the Santa Clause object 314-2, the snowman object 314-1, a Christmas tree, reindeer, the theme of Christmas, and the like. The image feature context 321 further includes the color themes data structures 322 present in the selected training images 310, 312, 314, and 316. In other words, each color theme data structure (e.g., 323) represents the current color theme or combination for a respective training image. For example, color theme data structure 323 represents the colors within the image 316, where the first two colors 323-1 represent the purple background of the image 316 and the three colors 323-2 represent a combination of the colors of the objects within the image 316. FIG. 3 illustrates that the neural network 324 is trained to recommend a color theme output 326 for a given training image, such as the training image 314, where the color set 326-1 (i.e., green, orange, and red) represents recommendations for coloring the objects within the image 314 and the color set 326-2 (i.e., red and white) represents recommendations for coloring the background within the image 314. As described in more detail below, the color them output 326 may be generated based on the 5 most dominant colors in the image 314.

Continuing with FIG. 3, based on the training indicated in 330, particular embodiments recommend multiple colors for the background of the input image 202, given the features of the objects 304, 306, and 308 within the input image 302. For example, for a combination of the objects 304, 306, and 308, particular embodiments recommend or cause a filling of the color green 342 as the background of the output image 340. Additionally or alternatively, for the snowman object 304, some embodiments recommend or cause a filling of the color red 344 as the background of another output image.

Alternatively or additionally, for the reindeer object 208, some embodiments recommend or causing a filling of the color red 246 as the background of another output image. Alternatively or additionally, for the reindeer object 208, some embodiments recommend or cause a filling of the color green 248 as the background of another output image. Alternatively or additionally, for the Santa Clause object 206, some embodiments recommend or cause a filling of the color orange 250 as the background of another input image. Alternatively or additionally, for a combination of the objects, particular embodiments recommend or cause a filling of the color red 252 as the background of yet another output image. In some embodiments, where a pixel-level pattern has been identified, some embodiments recommend or cause a filling of a particular color for the background, as illustrated in 254 and 256.

Figure 4:
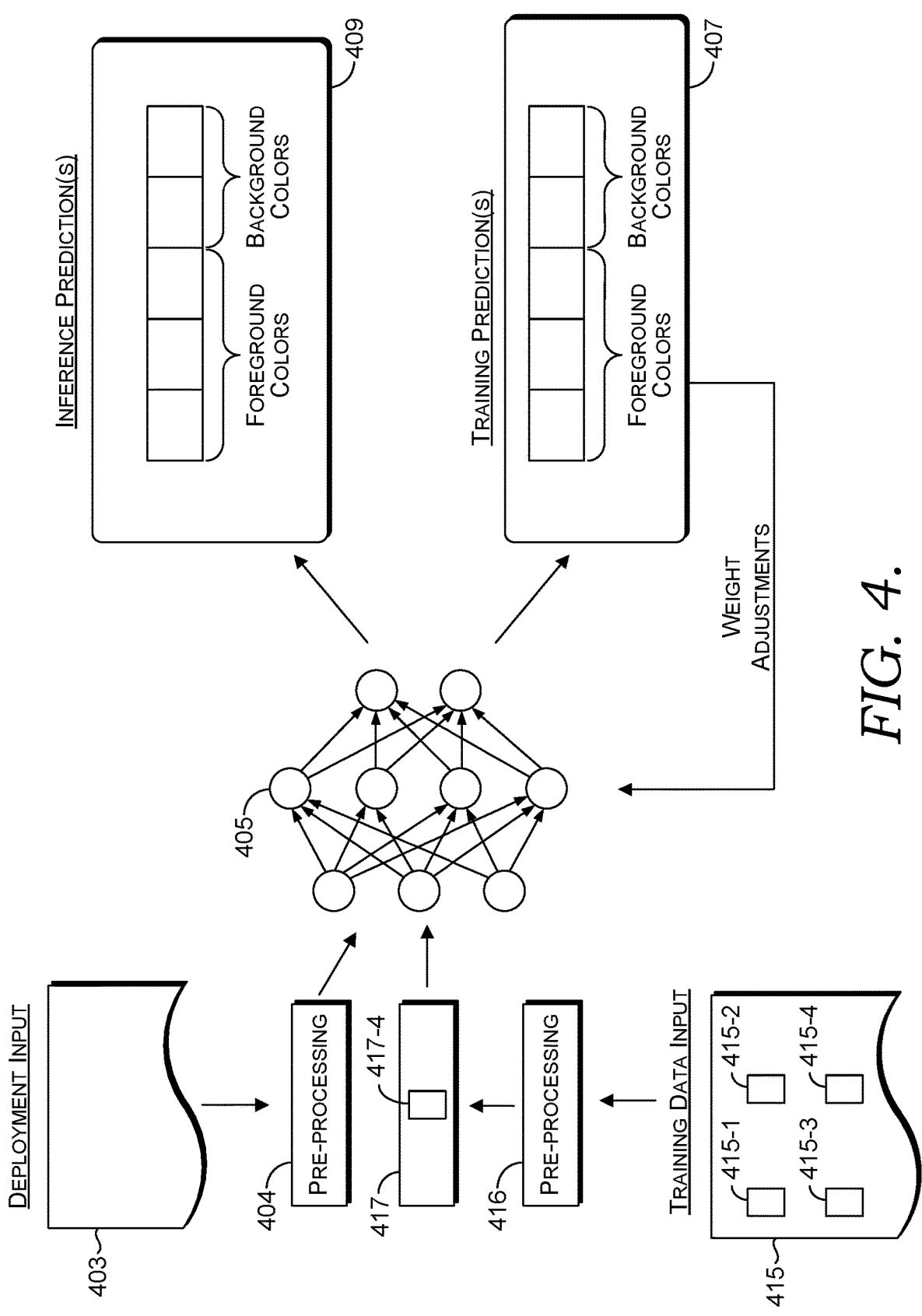
FIG. 4 is a schematic diagram illustrating how a neural network makes particular training and deployment predictions given specific inputs, according to some embodiments.

FIG. 4 is a schematic diagram illustrating how a neural network 405 makes particular training and deployment predictions given specific inputs, according to some embodiments. In one or more embodiments, the neural network 405 represents or includes at least some of the functionality as described with respect to the color recommender model/layer 218 of FIG. 2 and/or the color recommender 106 of FIG. 1. In some embodiments, the neural network 405 represents or includes alternative or additional model functionality, such as supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

In some embodiments, the neural network 405, as illustrated in FIG. 4, has multiple input nodes (input layer), hidden nodes, and multiple output nodes (an output layer), where each node represents an input variable or feature of an image (e.g., scarf, hat, nose, eyes, antlers, etc.) and where each node comprises a linear/non-linear function and an activation function. Every node in one layer is connected to every other node in the next layer. A given node typically takes the weighted sum of its inputs, and passes it through an activation function (e.g., a dot product vector). This is the output of the node, which then becomes the input of another node in the next layer. The signal flows from left to right, and the final output is calculated by performing this procedure for all the nodes. Training a neural network typically means learning the weights associated with all the edges (the lines connecting the nodes). The input features (x) are typically fed into the linear/non-linear function of each node, resulting in a value, z. Then, the value z is fed into the activation function, which determines if a node is activated or inhibited (e.g., between 0 and 1). Thus, each node ultimately determines which nodes in the following layer get activated, until it reaches an output.

In some embodiments, the training data input(s) 415 includes a user-tagged dataset of images, which were chosen by users to generate or modify colors of an image (e.g., a color theme) by a user. For example, the training data input(s) 415 can be ADOBE CAPTURE's creative user-tagged dataset.

In some embodiments, before the training data input(s) 415 (or the deployment input(s) 404) are provided as input into the neural network 405, the inputs are preprocessed at 416 (or 404). In some embodiments, such pre-processing includes removing the background 415-1 (e.g., masking all the pixels represented in the background 415-1), data wrangling, data munging, feature scaling, data normalization, feature extraction (e.g., Minimum Redundancy Maximum Relevance ("mRmR"), Relief, Conditional Mutual Information Maximization ("CMIM")), feature selection, missing data techniques (e.g., single imputation, log-linear models and estimation), outlier detection and correction techniques and the like. Error outliers include outlying observations that are caused by not being part of the targeted population of data, lying outside the possible range of values, errors in observation, errors in recording, errors in preparing data, errors in computation, errors in coding, or errors in data manipulation. These error outliers can be handled by adjusting the data points to correct their values or more such data points from the data set. In some implementations, particular embodiments define values more than three scaled median absolute deviations ("MAD") away from the median as outliers. Once defined as an outlier, some embodiments replace the values with threshold values used in outlier detection.

In some embodiments, the pre-processing 416 and/or 404 includes using a color library to pick prominent colors from objects and/or backgrounds to extract colors from training images or user images at deployment time. For example, some embodiments use ADOBE CAPTURE's color detection library. There are many colors in the color spectrum and the training images of the training data input(s) 415 or user images at the deployment input(s) 403 may have millions of color variations. Accordingly, in order to reduce CPU time and latency, particular embodiments map background and/or foreground colors within the input(s) 403 and/or 415 into 1 of a predetermined set of colors. For example, the predetermined set of colors may be black, yellow, pink, gold, light red, turquoise, olive drab, orchid, brown, orange, purple, golden, light blue, sandy brown, spring green, maroon, gray, red, blue, green, light cyan, chocolate, salmon, ivory, white, dark red, dark blue, silver, aquamarine, dark green, violet red, and wheat.

Continuing with the pre-processing 416 and/or 404, for each detected color in the training images of 415 or user images of 403, particular embodiments create a bucketing algorithm to put each detected color in one of the dominant color buckets (i.e., an individual color) by calculating the color distance (e.g., Euclidian distance) between the color in the images within the input(s) 403 and/or 415 and the predetermined set of color buckets. Particular embodiments fill the images of the input(s) 415 and/or 413 with one of the predetermined set of color buckets. Some embodiments, fill them in as a predetermined quantity of color buckets representing a theme, such as a set of 5 colors. In this way, the generate color theme for each image represents the object and/or background colors (e.g., 2 colors for the background and 3 for objects). In some embodiments, in order to reduce a color theme to the 5 (or any quantity) of the most dominant colors an image contains, each time a color is mapped to a predetermined bucket, counter logic is used to quantity the mapping. Accordingly, for example, each pixel of an image is mapped to a predetermined color bucket. If a total of 100 pixels were contained in a background, and 80 pixels were mapped to the color green, 10 pixels were mapped to a blue color, and 5 colors were mapped to an orange color, then embodiments would select the colors green and blue buckets (part of the predetermined set) as the color theme background for the set of objects in the same image.

In response to the preprocessing at 416, the input image 417 is produced as an output, which reflects the input image 415, except that the background 415-4 has been removed and/or the image has been filled with predetermined color buckets, as described above. Responsively, the input image 417 is fed to the neural network 405, which is trained to recommend/predict what color the background of the image 417 should be in order to make acceptable loss training prediction(s) 407 at the appropriate weights, which will help later at deployment time to make correct inference prediction(s) 409. In one or more embodiments, learning or training includes minimizing a loss function between the target variable (for example, an incorrect prediction that the background 417-4 should be X color) and the actual predicted variable (for example, a correct prediction that the background 417-4 should by Y color). Based on the loss determined by a loss function (for example, Mean Squared Error Loss (MSEL), cross-entropy loss, etc.), the loss function learns to reduce the error in prediction over multiple epochs or training sessions so that the neural network 405 learns which features and weights are indicative of the correct inferences, given the inputs. Accordingly, it is desirable to arrive as close to 100% confidence in a particular classification or inference as close as possible so as to reduce the prediction error. In an illustrative example, the neural network 405 learns over several epochs that for the given objects 415-1, 415-2, and 415-3, the recommended/predicted colors are Y, as illustrated in 407.

Subsequent to a first round/epoch of training, the neural network 405 makes predictions with a particular weight value, which may or may not be at acceptable loss function levels. For example, the neural network 405 may process another pre-processed input image a second time to make another pass of prediction(s) 407. This process may then be repeated for different input images over multiple iterations or epochs until the weight values are set for optimal or correct predicted value(s) is learned (for example, by maximizing rewards and minimizing losses) and/or the loss function reduces the error in prediction to acceptable levels of confidence.

In one or more embodiments, the neural network 405 converts or encodes the runtime deployment input(s) 403 and training data input(s) 415 into corresponding feature vectors in feature space (for example, via a convolutional layer(s)) or other machine-readable value (e.g., an integer in a matrix). A "feature vector" (also referred to as a "vector") as described herein may include one or more real numbers, such as a series of floating values or integers (for example, [0, 1, 0, 0]) that represent one or more features (e.g., nose, hat, scarf) of an image. Such features are encoded or converted into corresponding feature vectors so that computers can process the corresponding extracted features. For example, embodiments can convert an image into a matrix encode each pixel value of an image into a corresponding integer that represents the pixel value.

In some embodiments, such as in clustering techniques, the neural network 405 learns, via training, parameters, or weights so that similar features (e.g., Santa Clause objects) are closer (for example, via Euclidian or cosine distance) to each other in feature space by minimizing a loss via a loss function (for example, Triplet loss or GE2E loss). Such training occurs based on one or more of the preprocessed training data input(s) 415, which are fed to the neural network 405.

One or more embodiments determine one or more feature vectors representing the input(s) 415 in vector space by aggregating (for example, mean/median or dot product) the feature vector values to arrive at a particular point in feature space. For example, certain embodiments formulate a vector representing each detected object, and then aggregates or concatenates these values into a single feature vector.

In one or more embodiments, the neural network 405 learns features from the training data input(s) 415 and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (a hidden or output layer). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores.

In another illustrative example of training, one or more embodiments learn an embedding of feature vectors based on learning (for example, deep learning) to detect similar features between training data input(s) 415 in feature space using distance measures, such as cosine (or Euclidian) distance. For example, the training data input 415 is converted from string or other form into a vector (for example, a set of real numbers) where each value or set of values represents the individual features (for example, specific object features or background colors) in feature space. Feature space (or vector space) may include a collection of feature vectors that are each oriented or embedded in space based on an aggregate similarity of features of the feature vector. Over various training stages or epochs, certain feature characteristics for each target prediction can be learned or weighted. For example, the neural network 405 can learn that for the same set of objects in different training images, the most dominant background color is brown. Consequently, this pattern can be weighted (for example, a node connection is strengthened to a value close to 1), whereas other node connections (for example, a white color) are inhibited. In this way, embodiments learn weights corresponding to different features such that similar features found in inputs contribute positively for predictions.

In some embodiments, such training is supervised using annotations or labels. Alternatively or additionally, in some embodiments, such training is not-supervised using annotations or labels but can, for example, include clustering different unknown clusters of data points together. For example, in some embodiments, training includes (or is preceded by) annotating/labeling the images 417 with their objects, as well as their corresponding background and foreground colors (e.g., a set of the most dominant color buckets selected from the predetermined colors) so that the neural network 405 learns the features (e.g., the background colors), which is used to change the weights/neural node connections for future predictions. As such, the neural network 405 accordingly adjusts the weights by activating or inhibiting nodes.

The output of the training is the training prediction(s) 407, which is a recommended set of colors or color buckets, which represent the five dominant predicted color buckets for the image 417—i.e., a recommendation that the background 417 should include the two color buckets indicated in 407 and that one or more of the objects 415-1, 415-2, and/or 41503 should be (or are) three color buckets as indicated in 407.

In one or more embodiments, subsequent to the neural network 405 training, the neural network 405 (for example, in a deployed state) receives one or more of the pre-processed deployment input(s) 403. When a machine learning model is deployed, it has typically been trained, tested, and packaged so that it can process data it has never processed. Responsively, in one or more embodiments, the deployment input(s) 403 are automatically converted to one or more feature vectors and mapped in the same feature space as vector(s) representing the training data input(s) 415 and/or training predictions(s) 407. Responsively, one or more embodiments determine a distance (for example, a Euclidian distance) between the one or more feature vectors and other vectors representing the training data input(s) 415 or predictions, which is used to generate one or more of the inference prediction(s) 409. In some embodiments, the pre-processed deployment input(s) 403 are fed to the layers of neurons of the neural network 405, where the weights dictate the output.

In an illustrative example, the neural network 405 receives an input image in 403. The neural network 405 then determines a distance (for example, a Euclidian distance) between the vector representing the detected objects in the runtime deployment input(s) 403 and objects in the training data input(s) 415, where the input(s) 403 are passed through the same activated/deactivated nodes. Based on the distance being within a threshold distance, particular embodiments determine the most dominant background color buckets in the training images and then generate a score at inference prediction(s) 409, which is a recommendation on what the background color of the input image of 403 should be and which is the same color predictions as indicated in 407, since the objects are the same and most of the training images contained the same background colors.

In certain embodiments, the inference prediction(s) 409 (e.g., as produced by the model scoring component 168) may either be hard (for example, membership of a class is a binary "yes" or "no") or soft (for example, there is a probability or likelihood attached to the labels). Alternatively or additionally, transfer learning may occur. Transfer learning is the concept of re-utilizing a pre-trained model for a new related problem (for example, a new video encoder, new feedback, etc.).

Figure 5:
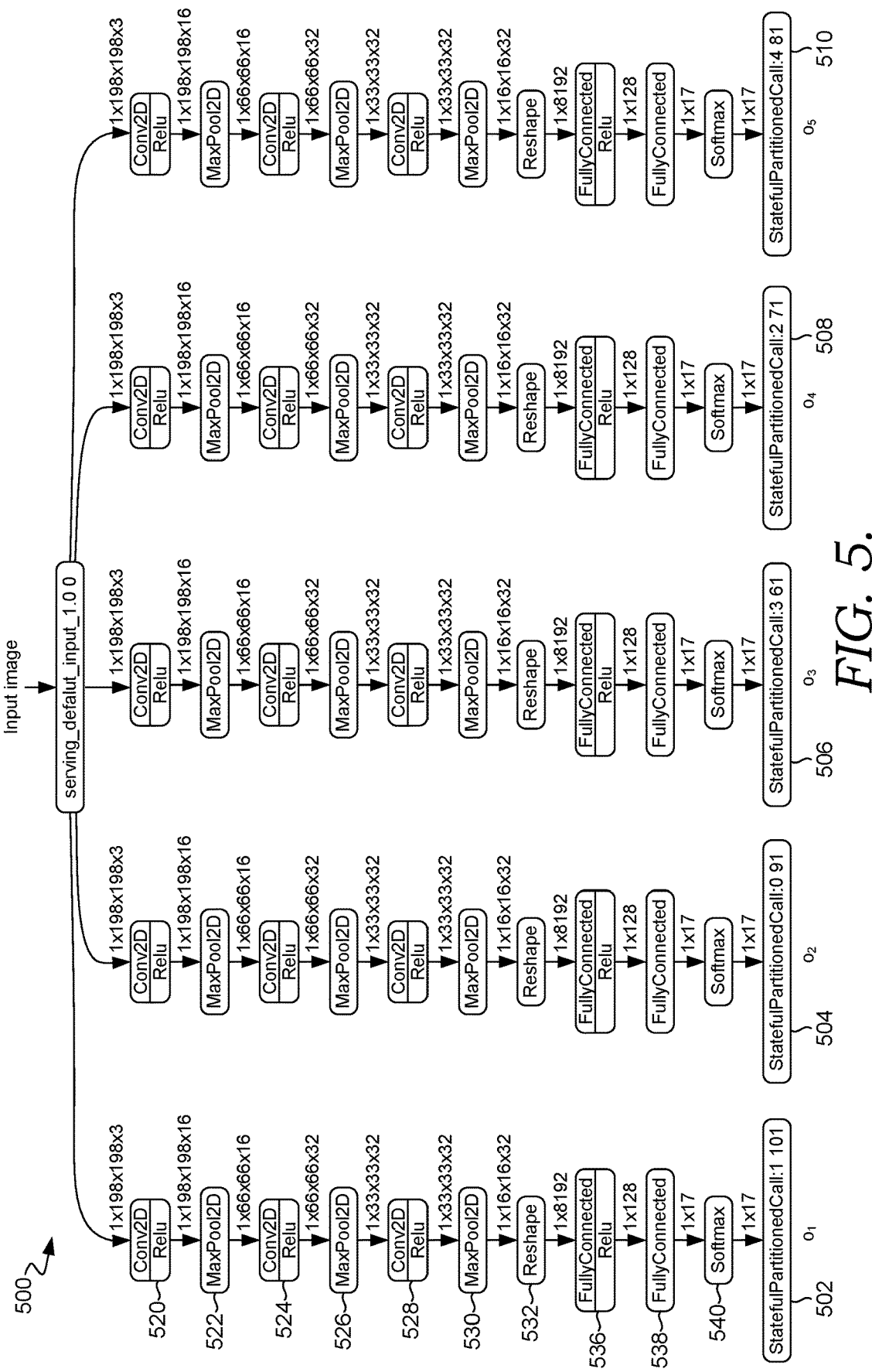
FIG. 5 is a schematic diagram of an example multi-output convolutional neural network that is used to recommend five colors for an input image, according to some embodiments.

FIG. 5 is a schematic diagram of an example multi-output convolutional neural network that is used to recommend five colors for an input image, according to some embodiments. In some embodiments, the multi-output CNN represents the neural network 405 of FIG. 4, the color recommender model/layer 218 of FIG. 2, and/or the color recommender 106 of FIG. 1. In contrast to traditional single-output learning (which only produces a single output), multi-output learning concurrently predict multiple outputs, as illustrated in 502, 504, 506, 508, and 510, which correspond to 5 recommended/predicted colors to fill an input image with.

At a first time the input image is first fed to CNN, which extracts one or more portions (e.g., a first window of pixels) of the input image, and then performs a convolution operation followed by a non-linear activation function ("ReLU") 520 to contract the portion into a particular set of channels (e.g., 64 channels and 5×5 (and/or 3×3) pixels). The convolution operation (or convolutional layer) utilizes one or more filter maps, which each represent a feature (e.g., a set of pixels) of the input image (e.g., representing a scarf of a snowman object). There may be various features of an image and thus there may be various linearly stacked filter maps for a given image. A filter map is also an array of values that represent sets of pixels and weights where a value is weighted higher when it matches a corresponding pixel or set of pixels in the corresponding section of the input image. The convolution layer includes an algorithm that uses each filter map to scan or analyze each portion of the input image. Accordingly, each pixel of each filter map is compared and matched up against a corresponding pixel in each section of the input image and weighted according to similarity. In some embodiments, the convolutional layer performs linear functions or operations to arrive at the filter map by multiplying each image pixel value with its own value and then performing a summation function of each product, which is then divided by the total quantity of pixels in the image feature. In various embodiments, in response to the convolution operations and ReLU being computed, a batch normalization (BN) is performed, which re-centers and re-scales the resulting set of pixels.

In various embodiments, a max pooling function 522 is then performed to compress the feature map (e.g., 128 channels and 256×256 pixels). Max pooling (i.e., the max pooling layer) reduces the dimensionality or compresses each feature map by picking a window size (i.e., a quantity of dimensional pixels that will be analyzed in the feature map) and selecting the maximum value of all of the values in the feature map as the only output for the modified feature map. For example, the max pooling layer can compress the 3×3 pixels described above to 2×2 via a max pooling operation.

In various embodiments, additional convolutional, non-linear activation functions, and max pooling operations (also known as "down sampling" or "contraction" or "encoder" operations) continues, as illustrated in 524, 526, 528, and 530. For example, a 3×3 convolutional operation, ReLU, and BN operation, can be followed by another 3×3 convolutional operation, ReLU, and BN operation, followed by another max pooling operation at 2×2. Then, in some embodiments, up sampling (also known as "expansion" or "decoder" operations) can be performed. For example, the 2×2 map can be up sampled, after which there is a 3×3 convolutional operation, ReLU, operation, and BN operation (which is repeated). Then additional up sampling can occur to arrive at 316, followed by 1×1 convolutional operation, which is a 512×512 pixel representation.

Reshaping 532 is the process of reformatting the input image based on network architecture requirements. The shape of input data must conform to neural network requirements, which is specified by the network's architecture. To match this expected shape, the input data is typically reshaped. This is required because the network makes assumptions about the data it will receive as input, which are built into the network's architecture. If the input data does not conform to the expected shape, the network will be unable to process it properly and may produce incorrect results. The input data is reshaped so that it can be formatted in a way that the network can understand and use for training. For example, there may be a dataset of images of different sizes. In order to train a CNN to classify the images, particular embodiments reshape all the images into a fixed size (e.g., 224×224 pixels) to that they can be processed by the CNN.

The fully connected layer, associated with 536 and 538, is a node or layer of neural network nodes that apply a linear transformation to the input vector through weights. Consequently, all possible connections layer-to-layer are presenting such that every input influences every output. In fully connected layers, the neuron applies a linear transformation to the input vector through a weights matrix. A non-linear transformation is then applied to the product through a non-linear activation function. The input to the fully connected layer is the output from the final pooling or convolutional layer, which is flattened and then fed into the fully connected layer.

A softmax function 540 is then performed, which assigns decimal probabilities to each class in a multi-class problem. The softmax function 540 is thus used as the last activation function of the CNN to normalize the output of a network to a probability distribution. These decimal probabilities typically add up to 1.0. For example, the output at 502 may be a 0.90 probability score that a background color for the input image should be blue. As illustrated in FIG. 5, the same steps (i.e., 520, 522, 524, 526, 528, 530, 532, 536, 538, and 54) are performed for other branches of the CNN.

Figure 6:
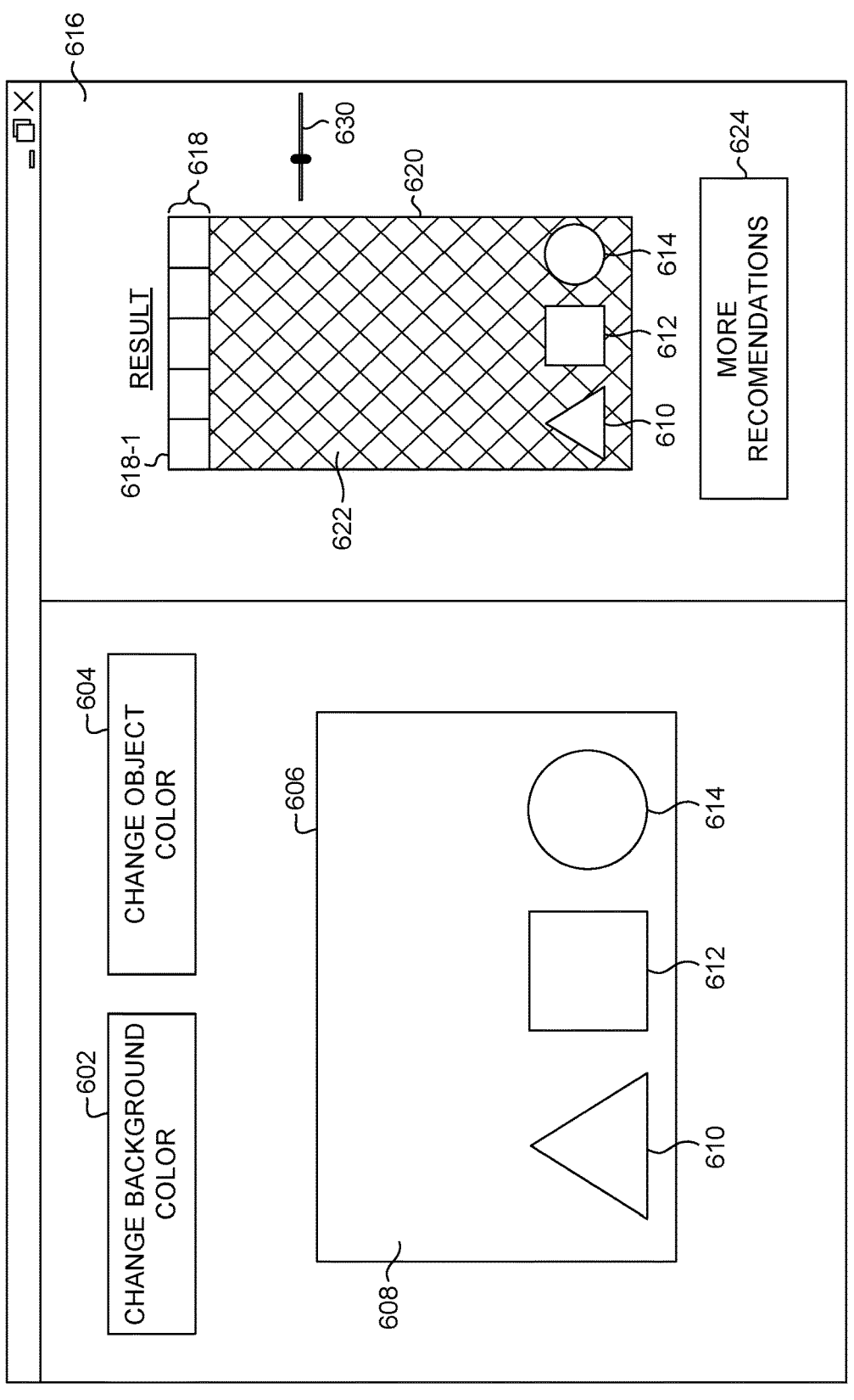
FIG. 6 is a screenshot of a user interface for changing color values of an image, according to some embodiments.

FIG. 6 is a screenshot 600 of a user interface for changing color values of an image, according to some embodiments. In some embodiments, the screenshot 600 includes the features as described with respect to the presentation module 120 of FIG. 1. At a first time, particular embodiments receive a request to upload the input image 616. Particular embodiments then responsively cause presentation, as illustrated in FIG. 6, of the input image 606. The input image includes the objects 610, 612, and 614, as well as the background 608. The user may desire to change color of one of the objects 610, 612, 614, and/or the background 608. In response to receiving an indication that the user has selected the "change object color" button 604, the object detector 102, the object boundary extractor 104 and the color recommender 106 all perform their functionality automatically to detect the objects 610, 612, and 616 and their boundaries and recommend colors for one of the objects.

As Illustrated in FIG. 6, the user has selected the button 602. Accordingly, in response to receiving an indication that the user has selected the "change background color" button

602, the object detector 102, the object boundary extractor 104 and the color recommender 106 all perform their functionality automatically to detect the objects 610, 612, and 616 and their boundaries and recommend one or more colors for the background 608. In some embodiments, such recommendation includes the color theme 618 (i.e., recommended color buckets to fill in the background with) and/or the output image 620 (i.e., the same image as the input image 606, except that the background 622 is a different color). As illustrated in the window pane 616, the output image 620 contains a different background 622, relative to the input image.

In some embodiments, the color theme 618 (a plurality of recommended color buckets) represent a set of background recommendations (e.g., 2 background buckets) and a set of foreground recommendations for the objects (e.g., 3 background buckets), as described herein. In some embodiments, in response to receiving an indication that the user has selected one of the color buckets (e.g., 618-1) and/or the background section 122, particular embodiments fill in or apply the background 122 with the corresponding color of the recommended bucket (e.g., 618-1). The same concept applies to the objects when objects are requested for color recommendations. For example, in response to receiving an indication that the user has selected one of the color buckets and/or one of the objects 610, 612, and/or 614 in the output image 620, particular embodiments fill in or apply the selected object(s) within the output image 620 based on those objects having been detected and/or the boundaries extracted (e.g., via semantic segmentation). In some embodiments, each of the color bucket recommendations are clearly labeled on the user interface, such as "background color recommendation" or "object color recommendation" (e.g., in response to a pointer/mouse hovering over the color bucket).

In some embodiments, in response to receiving an indication that the user has selected one of the color buckets (e.g., 618-1), particular embodiments activate or allow the user to then adjust, via the slider UI element 630, the selected color pixel value, with the starting value being the selected color bucket. For example, if color bucket 618-1 was a navy blue color, a slide, via the slider UI element 630, to the left, would turn the color to lighter blues until it became a turquoise color, whereas a slide to the right would cause the navy blue color to become a darker blue, until it became a night black color.

In some embodiments, in response to receiving an indication that the user has selected the "more recommendations" button 624, particular embodiments would cause presentation of an entire color scheme library of buckets, such as ADOBE CAPTURE's library pallets, where the predetermined set of colors may be black, yellow, pink, gold, light red, turquoise, olive drab, orchid, brown, orange, purple, golden, light blue, sandy brown, spring green, maroon, gray, red, blue, green, light cyan, chocolate, salmon, ivory, white, dark red, dark blue, silver, aquamarine, dark green, violet red, and wheat. In this way, the user can manually override any automated color recommendations in the color them 618 with any selection they want from the predetermined set of color buckets.

Exemplary Flow Diagrams

FIG. 7 is a flow diagram of an example process 700 for training a machine learning model, according to some embodiments. The process 700 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 6). The computer-implemented method, the system (that includes at least one computing device having at least one processor and at least one computer readable storage medium), and/or the computer readable medium as described herein may perform or be caused to perform the process 700 or any other functionality described herein.

Per block 702, some embodiments receive a user-tagged image. For example, the user-tagged image can be a sketch or photograph of a user that includes all the color changes a user made to the background and/or foreground. Per block 704, some embodiments detect a set of objects in the user-tagged image. For example, some embodiments use object detection to detect a location of the objects and classify the objects based on feature extraction. Per block 706, some embodiments remove a background of the user-tagged image such that only the set of objects are present in the user-tagged image. In some embodiments, the removing at block 706 occurs in response to the detecting of the set of objects. For example, all content in the user-tagged image that is not encompassed by a bounding box (or not defined via semantic segmentation) may be labeled as a background and therefore removed. In some embodiments, "removing" a background refers to or includes resetting all pixel values of the background to a single value, such as opaque. In this way all color and/or line segments or other features in the background are deleted with the objects remaining as-is.

Per block 708, some embodiments extract color values from the user-tagged image. In some embodiments, such color values are any quantity of pixel values from the set of objects and/or the background. Per block 710, some embodiments generate a similarity score indicative of a measure of similarity between each color value, of the color values, and each predetermined color bucket, of a plurality of color buckets. For example, some embodiments compare each color value, of the color values, with a respective predetermined color bucket, of the plurality of color buckets. "Comparing" in some embodiments includes determining a distance (e.g., a Euclidian distance) between these values. "Comparing" can also refer to using some other comparison function, such as a JACCARD index to determine overlap. In some embodiments, the similarity score refers to the exact distance between vectors representing these compared values or the difference in overlap via JACCARD index. In some embodiments, based on the generating of the similarity score, some embodiments rank each predetermined color bucket of the plurality of color bucket. Such ranking may be performed such that only one or more of those highly ranked color buckets within a comparison (e.g., distance or overlap) threshold are used to represent the color values of the original training image. For example, if the original user-tagged image has a blue background, the highest ranked predetermined color bucket is selected for 712.

Per block 712, some embodiments associate the training image with at least a portion of the plurality of predetermined color buckets based on the similarity score at block 710. For example, based at least in part on the ranking described above, some embodiments tag or supplement the training image, where the tagging indicates that the background of the user-tagged image is at least a first color of the predetermined color buckets and/or the set of objects is at least a second color of the predetermined color buckets. In other words, such tag or set of predetermined color buckets indicate what colors (or dominant colors) are within the background and/or objects of the user-tagged image.

Per block 714, based on the associating, some embodiments train a machine learning model by learning weights associated with the color values. For example, a neural network can learn that for the set of objects in the user-tagged image (and other training images that have the same objects), the most dominant background color is a brown color (one of the predetermined color buckets). Consequently, this pattern can be weighted (for example, a node connection representing the brown color is strengthened to a value close to 1), whereas other node connections (for example, a node connection representing a white color) are inhibited. In this way, embodiments learn weights corresponding to predicted colors based on the objects located in various training images.

FIG. 8 is a flow diagram of an example process 800 for making one or more recommendations for applying one or more color values to content of an input image, according to some embodiments. In some embodiments, the process 800 represents runtime or a time at which a model has been trained via the process 700 of FIG. 7.

Per block 803, some embodiments receive an input image, where the input image includes first content (e.g., a first set of pixels) and second content (e.g., a second set of pixels). In some embodiments the first and/or second content includes objects/foreground and/or a background. For example, the second content can include one of: a second set of one or more objects of the input image and a background of the input image.

Per block 805, some embodiments detect a first set of objects in the first content of the input image. In some embodiments, block 805 includes the functionality described with respect to the object detector 102 of FIG. 1. For example, some embodiments, detect, via object detection, a first set of one or more objects in the first content or perform image classification of the input image. In an illustrative example of block 805, some embodiments detect, via one or more bounding boxes, a location of the first set of one or more objects and classify the first set of one or more objects.

In some embodiments, boundary extraction is performed based on the detecting at block 805, as described with respect to the object boundary extractor 104 of FIG. 1. For example, in response to the detecting of the location and the classifying of the set of objects, some embodiments detect boundaries of the first set of one or more objects. And in response to the detecting of the boundaries, some embodiments cause the first set of objects to be highlighted at a user interface with a pixel value. For example, some embodiments perform semantic segmentation to identify the first set of objects and then set a different single pixel value for each different object class detected (e.g., via instance segmentation). For instance, a bird object and its boundaries can have a blue color applied to it, a car object and its boundaries can have a green color applied to it, and a sky object and its boundaries can have a red color applied to it.

Per block 807, some embodiments extract one or more features from the first set of object(s) (or the first content), where the features exclude any color features (e.g., pixel values representing color of the content) of the first set of object(s). In some embodiments, block 807 occurs in response to block 805. However, in some embodiments, block 807 occurs before or as a part of detecting or classifying objects in block 805. In some embodiments, block 805 need not occur at all in the process 800. In some embodiments, block 807 represents image classification, where, for example, image features or patterns can be learned in order to classify an image. For example, in an image of a car, particular embodiments extract car door features, tire features, windshield features and compare them against training images of cars to classify that the object is a car. In an illustrative example, a vector or matrix representing the spatial orientation of different pixel values can be passed to a model, where the model compares the distance to other vectors of other objects, where the closest vector, in distance, is another vector representing a car. Accordingly, embodiments can classify the input image to be or contain a car based on the vector representing a car being closest in distance to the vector representing the input image.

In an example illustration of image classification or object classification, in response to the extracting of the set of features from the first content, some embodiments remove a background such that only a first set of one or more objects are present in the input image, as described above. Some embodiments responsively compare a vector representing the first set of features with respective vectors, where each vector representing a second set of one or more feature of objects indicated in training images. Based on the comparing, some embodiments generate a similarity score for each respective vector, where the similarity score is indicative of a measure of similarity between the first set of features and the second set of features. For example, some embodiments determine a distance (e.g., a Euclidian distance) for a vector representing a car and all of its features and another vector representing another car and its features and the distance is determined to be X.

Per block 809, based on the feature(s), some embodiments generate one or more scores (e.g., a softmax color classification score) indicative of one or more recommendations for applying one or more color values to the second content. For example, based on the similarity score (described above) exceeding a threshold score for a first set of training images (e.g., the class of the first set of objects match the same class of objects located in the first set of training images), some embodiments identify background color of the first set of training images, where the generating one or more scores indicative of one or more recommendations for applying one or more color values to the second content is based on the identifying of the background color. For example, for those training images containing the same classified objects as those indicated in the training images (based on distance/score being high), particular embodiments identify the background colors for such training images and perform a dot product of, aggregate, or select one or more of the identified background colors for the recommendation score. The "Selection" of one or more of the recommended background colors may be based on which is the most prominent background color(s) in the identified set. For example, if the identified background colors of the training set included 3 green background colors and 1 blue color, some embodiments select the green color because the 3 count is higher than the 1 count.

Ins some embodiments, the generating of the one or more scores at block 809 is based on training a machine learning model via user-tagged images, where the user tagged-images correspond to images that users modified by changing or applying color of the images. For example, block 809 can be based on the process 700 of FIG. 7. For example, embodiments may recommend the same background color theme as the user-tagged image in 700 because the input image may contain the same detected objects.

In some embodiments, the generating of the one or more scores at block 809 is based on using a multi-output convolutional neural network (CNN), where a first set of outputs represent a first predetermined quantity (e.g., 3) of colors or buckets of objects and a second set of outputs represent a second predetermined quantity (e.g., 2) of colors or buckets of a background. Such functionality is described, for example, with respect to the CNN of FIG. 5.

In some embodiments, the process 800 includes additional functionality, such as extracting a second set of features from the first set of objects, where the second set of features include color features of the first set of objects. For example, some embodiments can extract information, such as all the pixel color values within the first set of objects. And based further on the color features of the first set of objects, some embodiments generate the one or more scores at block 809. This concept takes into account that the colors of objects can additionally be used to recommend colors of the background or other objects. For example, some embodiments can additionally use contrastive rules to additionally provide scores for recommendations. For instance, because an object's color is white, some embodiments can increment a score for a darker color because it contrasts better than a lighter color (in addition to modifying the score based on features from user-tagged images).

Exemplary Operating Environments

Figure 9:
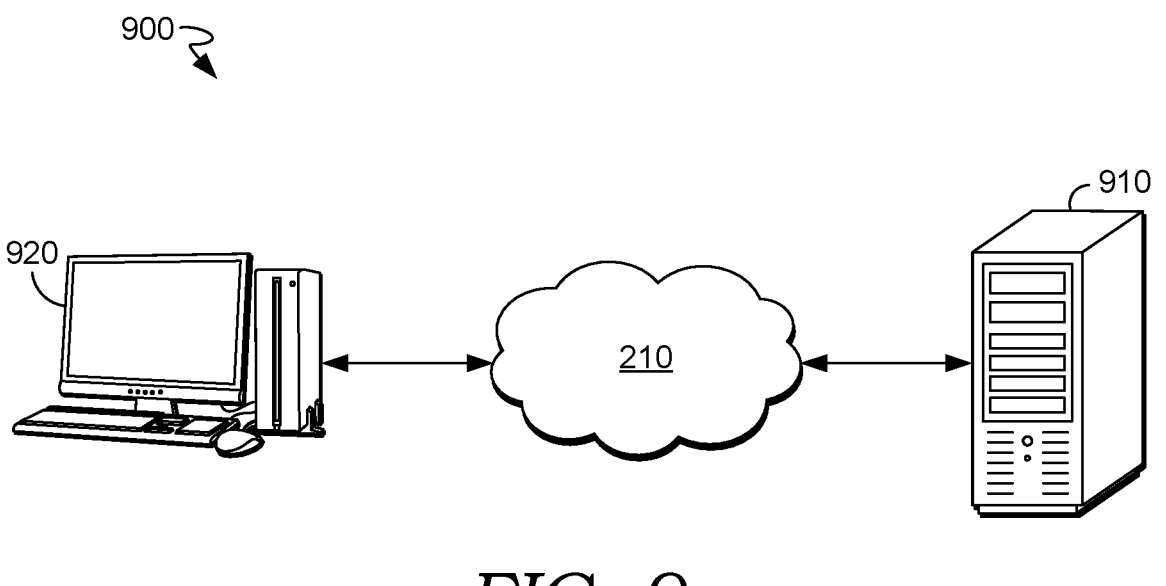
FIG. 9 is an example computer environment in which aspects of the present disclosure are employed, according to some embodiments.

Turning now to FIG. 9, a schematic depiction is provided illustrating an example computing environment 900 for recommending one or more color values for applying to an input image, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 910 that represent nodes in a cloud computing network. Various functions described herein as being performed by one or more entities may be carried out by hardware, firmware, and/or software. For instance, various functions may be carried out by a processor executing instructions stored in memory.

The environment 900 depicted in FIG. 9 includes a prediction server ("server") 910 that is in communication with a network 110. The environment 900 further includes a client device ("client") 920 that is also in communication with the network 110. Among other things, the client 920 can communicate with the server 910 via the network 110, and generate for communication, to the server 910, a request to make a detection, prediction, or classification of one or more instances of a document/image. The request can include, among other things, a document with content order values. In various embodiments, the client 920 is embodied in a computing device, which may be referred to herein as a client device or user device, such as described with respect to the computing device 1000 of FIG. 10.

In some embodiments, each component in FIG. 1 or FIG. 2 is included in the server 910 and/or the client device 920. Alternatively, in some embodiments, the components of FIGS. 1 or 2 are distributed between the server 910 and client device 920.

The server 910 can receive the request communicated from the client 920, and can search for relevant data via any number of data repositories to which the server 910 can access, whether remotely or locally. A data repository can include one or more local computing devices or remote computing devices, each accessible to the server 910 directly or indirectly via network 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 910 is embodied in a computing device, such as described with respect to the computing device 1000 of FIG. 10.

Figure 10:
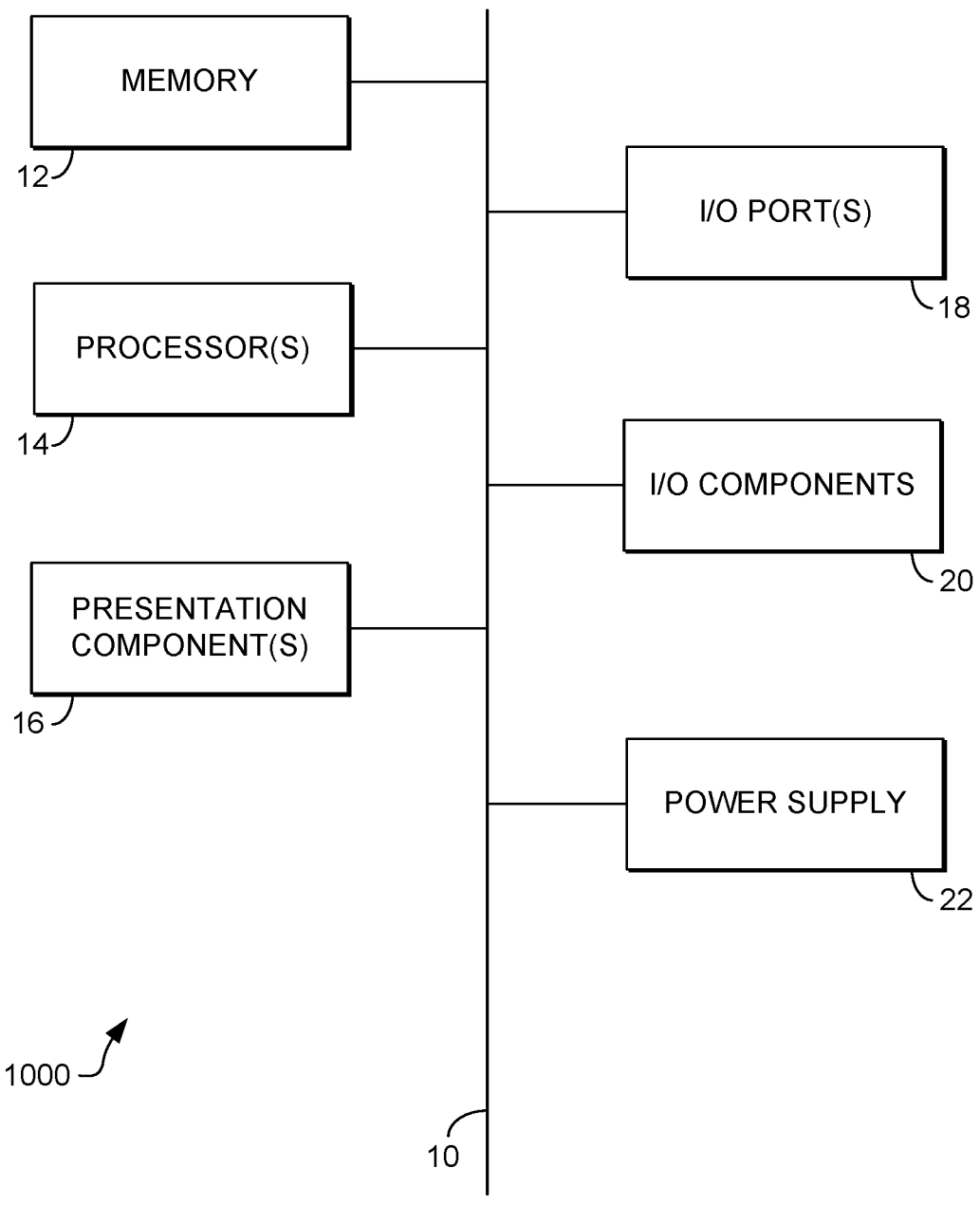
FIG. 10 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Looking now to FIG. 10, computing device 1000 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1000 represents the client device 920 and/or the server 910 of FIG. 9.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 700 of FIG. 7, process 800 of FIG. 8, or any functionality described with respect to FIGS. 1 through 9.

I/O ports 18 allow computing device 1000 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:

at least one computer processor; and one or more computer storage media storing computer-useable instructions that, when used by the at least one computer processor, cause the at least one computer processor to perform operations comprising:

receiving first image, the first image including first content and second content;

detecting, in the first content of the first image, a first object of a first class, the first class excluding any color features; and based on the detected first object in the first content being the first class, automatically generating one or more scores indicative of one or more recommendations for applying one or more color values to the second content.

2. The system of claim 1, wherein the one or more operations further comprising: mapping the first object of the first class to at least a second object of the first class of a second image, and wherein the automatic generating of the one or more scores indicative of one or more recommendations for applying one or more color values to the second content is further based on the mapping of the first object of the first class to at least the second object of the first class of the second image.

3. The system of claim 2, wherein the generating of the one or more scores is based on training a machine learning model via user-tagged images, the user-tagged images corresponding to images that users modified by changing color of the images, and wherein the second image is included in the user-tagged images.

4. The system of claim 1, wherein the generating of the one or more scores is based on using a multi-output Convolutional Neural Network where a first set of outputs represent a first predetermined quantity of colors of objects and a second set of outputs represent a second predetermined quantity of colors of a background.

5. The system of claim 1, wherein detecting of the first object includes:

detecting, via one or more bounding boxes, a location of the first object; and classifying the first object as belonging to the first class.

6. The system of claim 5, wherein the operations further comprising:

in response to the detecting of the location and the classifying, detecting boundaries of the first object; and in response to the detecting of the boundaries, causing the first object to be highlighted at a user interface with a pixel value.

7. The system of claim 1, wherein the operations further comprising:

receiving the second image, the second image includes a second set of one or more objects and a background;

detecting the second set of one or more objects; and removing the background such that only the second set of one or more objects are present in the second image.

8. The system of claim 7, wherein the operations further comprising:

extracting color values from the second image;

comparing each color value, of the color values, with a respective predetermined color bucket, of a plurality of predetermined color buckets;

based on the comparing, generating a similarity score for each predetermined color bucket, the similarity score is indicative of a measure of similarity between each color value of the color values and each predetermined color bucket of the plurality of predetermined color buckets;

based at least in part on the generating of the similarity score, ranking each predetermined color bucket of the plurality of predetermined color buckets;

based at least in part on the ranking of each predetermined color bucket, associating the second image with at least a portion of the plurality of predetermined buckets; and based at least in part on the associating, training a machine learning model by learning weights associated with the color values, and wherein the generating of the one or more scores is based at least in part on the training of the machine learning model.

9. The system of claim 1, wherein the operations further comprising:

extracting a second set of features from the first object, the second set of features including color features of the object; and based further on the color features of the first object, generating the one or more scores indicative of the one or more recommendations for applying the one or more color values to the second content.

10. A computer-implemented method comprising:

receiving an input image, the input image including first content and second content;

extracting a first set of one or more features from the first content, the one or more features representing a spatial orientation of elements within the first content, wherein the one or more features excluding any color features in the first content; and based on the spatial orientation of the elements within the first content, automatically generating one or more scores indicative of one or more recommendations for applying one or more color values to the second content.

11. The computer-implemented method of claim 10, wherein the first content includes one of: a first set of one or more objects of the input image and a first background of the input image, and wherein the second content includes one of: a second set of one or more objects of the input image and the first background of the input image.

12. The computer-implemented method of claim 10, wherein the generating of the one or more scores is based on training a machine learning model via user-tagged images, the user-tagged images corresponding to images that users modified by changing color of the images.

13. The computer-implemented method of claim 10, wherein the generating of the one or more scores is based on using a multi-output Convolutional Neural Network where a first set of outputs represent a first predetermined quantity of colors of objects and a second set of outputs represent a second predetermined quantity of colors of a background.

14. The computer-implemented method of claim 10, wherein the extracting of the first set of one or more features from the first content is based on one of: detecting, via object detection, a first set of one or more objects or performing image classification of the input image.

15. The computer-implemented method of claim 14, further comprising:

in response to the extracting, causing the first set of one or more objects to be highlighted at a user interface with a pixel value.

16. The computer-implemented method of claim 10, further comprising:

in response to the extracting of the first set of one or more features from the first content, removing a background such that only a first set of one or more objects are present in the input image;

comparing a vector representing the first set of one or more features with respective vectors, each respective vector representing a second set of one or more features of objects indicated in training images;

based on the comparing, generating a similarity score for each respective vector, the similarity score is indicative of a measure of similarity between the first set of one or more features and the second set of one or more features; and based on the similarity score exceeding a threshold score for a first set of training images, identifying a background color of the first set of training images, wherein the generating one or more scores indicative of one or more recommendations for generating one or more color values for the second content is based on the identifying of the background color.

17. The computer-implemented method of claim 16, further comprising:

based on the identifying of the background color, filling in the background with one of the identified background colors.

18. The computer-implemented method of claim 10, further comprising:

extracting a second set of features from the first set of one or more objects, the second set of features including color features of the first set of one or more objects; and based further on the color features of the first set of one or more objects, generating the one or more scores indicative of the one or more recommendations for applying the one or more color values to the second content.

19. A computerized system, the system comprising:

an object detector means for receiving an input image, the input image including first content and second content;

wherein the object detector means is further for detecting a first set of one or more objects in the first content of the input image by detecting, via one or more bounding boxes, a location of the first set of one or more objects and classifying the first set of one or more objects to a first class;

determining a boundary of the one or more objects; and a color recommending means for automatically generating, in response to the detecting, one or more scores indicative of one or more recommendations for applying one or more color values to the second content based on the first class of the first set of one or more objects and the determining of the boundary of the one or more objects.

20. The system of claim 19, wherein the second content includes one of: a second set of one or more objects of the input image and a background of the input image.

* * * * *